(12) United States Patent
Hutson et al.

(10) Patent No.: US 7,465,417 B2
(45) Date of Patent: Dec. 16, 2008

(54) PARAMETRIC INJECTION MOLDING SYSTEM AND METHOD

(75) Inventors: Lee Merrill Hutson, Gassville, AR (US); Svante Wold, Kinnelon, NJ (US)

(73) Assignees: Baxter International Inc., Deerfield, IL (US); Umetrics AB, Umea (SE)

( * ) Notice: Subject to any disclaimer, the term of this patent is extended or adjusted under 35 U.S.C. 154(b) by 864 days.

(21) Appl. No.: 10/894,496

(22) Filed: Jul. 19, 2004

(65) Prior Publication Data

US 2006/0012064 A1 Jan. 19, 2006

(51) Int. Cl.
B29C 45/76 (2006.01)
B29C 45/77 (2006.01)
B29C 45/78 (2006.01)

(52) U.S. Cl. ............... 264/40.1; 264/40.3; 264/40.5; 264/40.6; 264/328.1; 264/334; 700/108; 700/109; 700/110; 700/197; 700/200; 700/201; 700/202; 700/203; 425/140; 425/145; 425/147; 425/149; 425/159; 425/160; 425/169; 425/170

(58) Field of Classification Search ............... 264/40.1, 264/40.3, 40.5, 40.6, 328.1, 334; 700/108–110, 700/197, 200–203; 425/140, 145, 147, 149, 425/159, 160, 169, 170
See application file for complete search history.

(56) References Cited

U.S. PATENT DOCUMENTS 6,517,754 B1    2/2003    Hehl 6,878,316 B1 *  4/2005    Cochran et al. ............ 264/40.1

FOREIGN PATENT DOCUMENTS

| EP | 0756219 A | 1/1997 |
| JP | 04238013 | 8/1992 |
| JP | 10-113967 | * 5/1998 |
| JP | 10113967 | 5/1998 |

OTHER PUBLICATIONS

Translation of JP 10-113967-May 1998.*
Yacoub F et al, "Product Optimization And Control In The Latent Variable Space Of Nonlinear PLS Models," Chemometrics And Intelligent Laboratory Systems, Jan. 28, 2004, vol. 70, No. 1, pp. 63-74.
Thyregod Peter, "Modelling And Monitoring In Injection Molding," Online 2001, Retrieved from the Internet: URL: http://www2.imm.dtu.dk/documents/ftp/phdliste/phd80_01.pdf., pp. 79-100.

* cited by examiner

Primary Examiner—George R Koch, III
(74) Attorney, Agent, or Firm—Robert M. Barrett; Michael Beckett

(57) ABSTRACT

The present invention provides a method and system for controlling the quality of a product produced by an injection molding production process. The invention includes performing a multivariate analysis on injection molding process data collected real-time and determining whether the real-time data is within a predetermined production control limit. When the real-time production data exceeds the control limit, the process is considered out of control and product produced during the out of control condition is removed real-time from the injection molding production process.

17 Claims, 1 Drawing Sheet

US 7,465,417 B2

PARAMETRIC INJECTION MOLDING SYSTEM AND METHOD

BACKGROUND OF THE INVENTION

The present invention generally relates to a method and system for controlling the quality of a product produced by an injection molding production process and in particular, to a parametric release method and system that performs an analysis of the production parameters and removes defective product from the process when the production parameters exceed a predetermined control limit.

It is commonly known to monitor various process and product parameters to evaluate the quality of the product produced by an injection molding operation. Quality control through inspection of final product, for example, typically occurs downstream from the injection molding operation. Inspection of final product, however, does not take into account the molding process and any variability associated with the overall process. As a result, post-process product inspection fails to provide a mechanism to determine the factors contributing to any defective product produced.

Statistical process control (SPC) has also been applied to the injection molding process to monitor, measure and analyze process variation in order to determine whether the injection molding process is operating within control limits. The production process is typically halted when SPC determines an out of control condition allowing for the cause of the out of control condition to be identified and rectified before production is resumed. This results in significant production downtimes that are detrimental to production economies. Moreover, SPC does not have the capability to identify correlations between all the process variables that are monitored during production. It is therefore possible for an SPC-monitored process to produce undetected defective product during an aberrant cycle.

A need therefore exists for a system and method for analyzing production process parameters that determines whether a product produced by an injection molding process is defective and subsequently removes the defective product from the process. A need further exists for a defective product identification and removal system and method that operates without halting the entire production process.

SUMMARY OF THE INVENTION

The present invention provides methods and systems for injection molding processes.

In an embodiment of the present invention, a method for controlling the quality of a product produced by an injection molding process is provided. The method includes generating an injection molding process model from injection molding process data. The injection model process data may be input manually into a data storage device or automatically collected from the injection model process and subsequently stored. Generation of the injection molding process model defines a control limit for the production process. The method further includes collecting real-time injection molding process data and determining whether the real-time injection molding process data is within the control limit. When the real-time process data exceeds the control limit, the process is considered out of control and the method removes the product produced under the out of control condition from the injection molding process. In an embodiment, the determination that the real-time process data exceeds the control limit and the subsequent removal of the product from the process occurs in real-time. This advantageously connects control of the injection molding process with product quality.

In another embodiment of the present invention, a method for parametrically releasing a product produced by an injection molding production process is provided and includes collecting real-time production data from the injection molding production process and comparing the real-time production data to a predetermined production control limit. The method further includes determining whether the real-time production data is within the predetermined production control limit, and removing from the injection molding production process any defective product produced when the real-time production data exceeds the control limit. In an embodiment, the injection molding process proceeds or otherwise continues to produce product as defective product is removed from the process.

In a further embodiment of the present invention, an automated system for controlling the quality of a product produced by an injection molding production process is provided. The system includes a data analysis module that generates a predetermined injection molding production control limit, a data collection device that collects real-time injection molding production process data. A prediction module determines whether the real-time injection molding process data is within the control limit. A diversion device in operative communication with the prediction module removes from the injection molding production process any potentially defective product produced when the real-time injection molding production process data exceeds the control limit.

Additional features and advantages of the present invention are described in and will be apparent from the following Detailed Description of the Presently Preferred Embodiments.

DETAILED DESCRIPTION OF THE PREFERRED EMBODIMENTS

Figure 1:
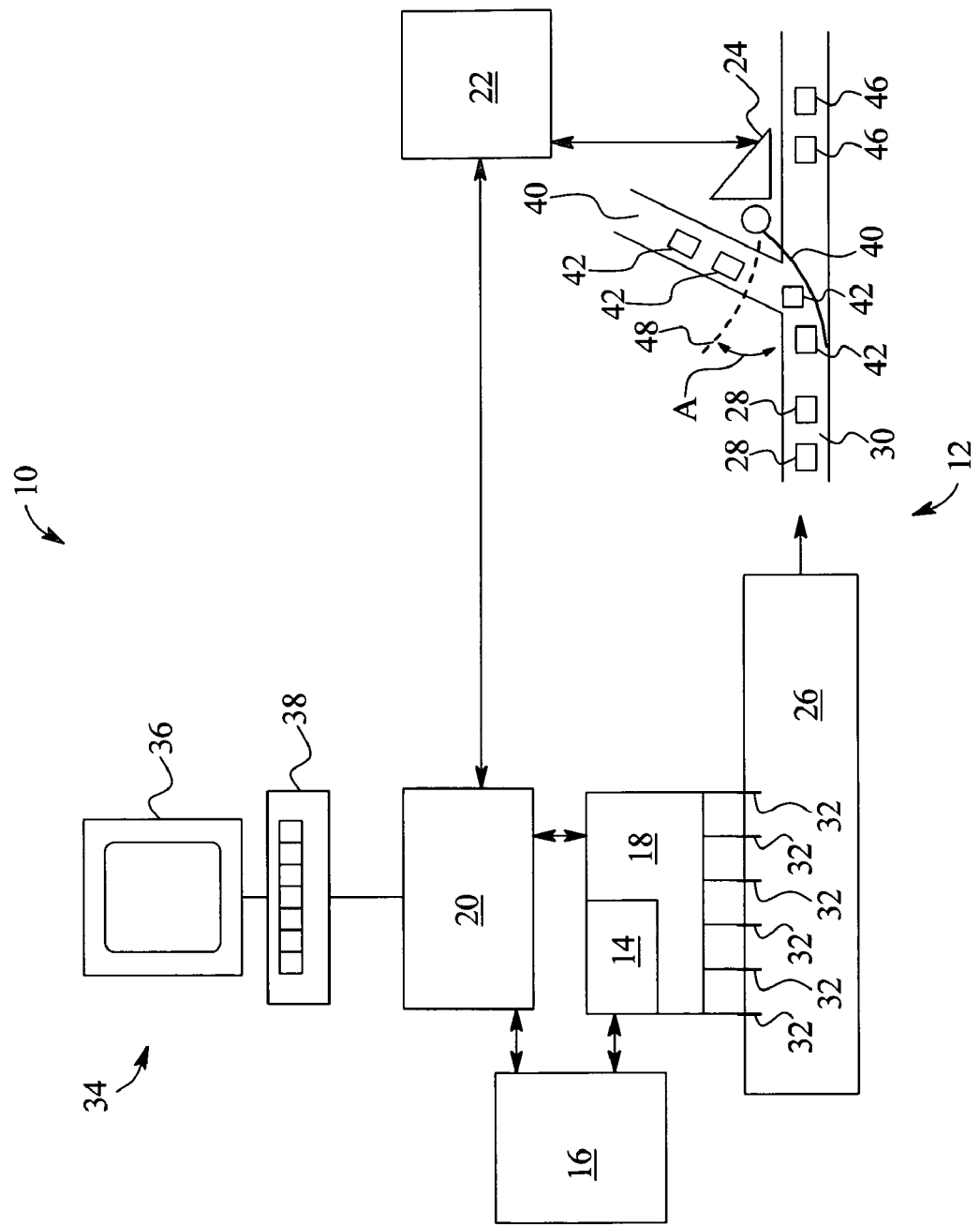
FIG. 1 is a schematic diagram of a system for controlling product quality for an injection molding process in accordance with the present invention.

The present invention generally relates to a parametric release system and method for controlling the quality of a product produced by an injection molding process. A parametric release system is a system that assures that the product produced (i.e., released product) is of the intended quality based on information collected during the production process. Data monitored during the production process is used to maintain real-time process control to assure the quality of the product at a desired level. Product released in a parametric release system is based on data collected during production instead of finished product data or inspection of the finished product. Referring to FIG. 1, where like reference numerals denote like structure and elements, a system 10 for controlling the quality of a product produced by an injection molding process is depicted. System 10 includes an injection molding production process 12, a data storage device 14, a data analysis module 16, a data collection device 18, a prediction module 20, a controller 22 and a diversion device 24.

Injection molding production process 12 includes an injection molding machine 26. Injection molding machines are well-known in the art and typically include a clamping system, a mold system, an injection system having a screw rotating shaft or hydraulic system, and an ejector shaft. Injection molding machine 26 produces a product 28, typically of a thermoplastic material, which may be moved to another location by transporter 30, such as a conveyor or the like, for further processing, packaging, or shipping.

Data storage device 14 stores injection molding process data. Although FIG. 1 shows data storage device 14 removed from injection molding machine 26, it is understood that data storage device 14 may be configured locally as a component of injection molding machine 26. Alternatively, data storage device 14 may be distributed through a network (such as a local or wide area network) that may further be operatively connected to a centralized data storage database. In an embodiment, data storage device 14 includes retrievable file formats adapted to store injection molding process data. The retrievable file formats may be adapted to injection molding production process 12, injection molding machine 26, and/or the product being produced. Data may be input into data storage device 14 either manually or automatically.

In an embodiment, data collection device 18 may be operatively connected to injection molding machine 26 to automatically collect raw injection molding process data for a plurality of selected injection molding process parameters 32. Data collection device 18 may be adapted to collect either digital or analog process data inputs from injection molding machine 26. Data collection device 18 subsequently converts or otherwise formats these data inputs as retrievable data points into data storage device 14. This allows the data stored in data storage device 14 to be retrieved for future review and/or analysis.

Process parameters 32 may be any number of variables, parameters, data points and/or conditions that are typically monitored during the injection molding process as is commonly known in the art. Nonlimiting examples of suitable process parameters that may be collected by data collection device 18 include cycle time, melt temperature, fill time, melt pressure, cool time, pack time, mold temperature stationary, mold temperature moveable, injection time, hold time, shot velocity, shot cushion, fill pressure, pack pressure, hold pressure, backpressure, machine decomposition, hydraulic transfer pressure, position transfer, barrel temperatures, nozzle temperature, and combinations thereof.

The number and specific type of process parameters monitored may be user configurable. The skilled artisan will appreciate that the number and type of process parameter data collected should include as many parameters as necessary to properly represent the overall injection molding process. In an embodiment, the collected injection molding process parameters may undergo a qualification evaluation in order to optimize the molding process. This qualification analysis may include economic considerations as well as product quality considerations. Such an evaluation may assist in improving the quality level of the product produced.

Data analysis module 16 analyzes the data stored in data storage device 14 to generate an overall injection molding process model. This analysis includes modeling the stored injection molding process parameter data to determine the correlation structures present within the data. This correlation structure is developed using multivariate data analysis techniques, such as principal components analysis (PCA), a Hotelling $T^2$ statistic, distance to the model (DModX) statistics, and projection to latent structures (PLS).

PCA forms the basis for the multivariate data analysis. PCA classifies the variables by reducing the number of variables and detecting structure in the relationships between variables, as is commonly known in the art. PCA determines lines, planes, and hyperplanes in a multidimensional space that best approximate the data in a least squares context. This enables PCA to detect natural clusters of data. The data clusters are related by the correlation structure of the data and from natural data groupings based on the shifts seen in the correlation structure.

The Hotelling $T^2$ statistic is used to summarize k variables/parameters scores into a low dimensional space (e.g., a two dimensional space), with the control limits being bound in an ellipsoid otherwise known as a confidence region. The confidence region may be within a six-sigma range, but is typically not assigned a sigma value. The number of parameters (k) determines the number of dimensions within the model. The Hotelling $T^2$ statistic may be used for visual simplification as well as a reduction method to project points from a k-dimensional space down on to a low dimensional space bound by an ellipsoidal control region. The Hotelling function may be represented by $T^2$ where:

$$T_i^2 = \sum_{a=1}^{A} \frac{t_{ia}^2}{s_{ta}^2}$$

Where A=number of components in the PCA model, $t_{ia}$=score of the $a^{th}$ component for observation i, and $s^2_{ta}$=variance of the scores for the $a^{th}$ component.

The DModX statistic is equivalent to the residual standard deviation of the observation. DModX may also be referred to as the distance from the process model plane. The DModX statistic may be used for detection of process upsets, more specifically it detects upsets that cause a change in the correlation structure of the process. The DModX statistic may be represented by $s_t$ where:

$$s_t = \sqrt{\frac{\sum e_{ik}^2}{(K - A)}}$$

Where $e_{ik}$=residuals in X for observation i, K=number of X variables and A =number of components in the PCA model.

Projections to latent structures by means of partial least squares (PLS) is a method of relating two data matrices, X and Y, to each other by a linear multivariate model. Projections to latent structures analyze data with many, noisy, collinear and even incomplete variables in both X and Y. For parameters related to the observations, the precision of a PLS-model improves with the increasing number of relevant X-variables.

Data analysis module 16 retrieves data stored from data storage device 14 and performs a multivariate statistical analysis on the injection molding process data using any combination of statistical analytical tools previously described. The multivariate analysis generates an injection molding process model which establishes a control limit for the process. The skilled artisan will appreciate that the more historical data that are available to be input into the model, the more robust the process model will be. It is therefore desirable to capture into the model deviations seen during normal process runs, such as material lot variability, humidity changes, etc.

In an embodiment, data analysis module 16 transforms the injection molding process data into one or more surrogate variables using a human configurable transformation application. The transformation application selects a set of process parameters and performs statistical analysis to obtain one or more low-dimensional surrogate values. The transformation typically includes reducing a vector time series to a scalar data set. Data analysis module 16 subsequently calculates a Hotelling $T^2$ value and/or a DModX value for the surrogate variable or variables. These values may be used to define the control limit.

Once data analysis module 16 has generated an acceptable injection molding process model, system 10 may be used for real-time analysis of the injection molding process. Data collection device 18, which is operatively connected to prediction module 20, collects real-time injection molding process data from parameters 32 upon initiation of the injection molding process. The real-time injection molding data collected by data collection device 18 are subsequently delivered to prediction module 20 which performs a multivariate statistical analysis on the real-time injection molding data using any combination of the statistical tools previously discussed. Prediction module 20 is also operatively connected to data analysis module 16 enabling predictor module 20 to compare the real-time injection molding process data with the injection molding process model. By comparing the real-time process data to the injection molding process model, prediction module 20 is able to determine whether the real-time injection molding data is within the control limit of the injection molding process model.

In an embodiment, prediction module 20 calculates a Hotelling $T^2$ value and a DModX value for the real-time injection molding data. Prediction module 20 then compares the Hotelling $T^2$ value and the DModX value calculated from the real-time data set to the control limit defined by the Hotelling $T^2$ value and the DModX value calculated for the surrogate variable(s). This permits the quality of the injection molded product to be ascertained on a real-time basis based on the surrogate variables. When the real-time injection molding process parameters are within the specified values of the process model, the injection molding process is in control and the product quality is considered acceptable. If either one of the Hotelling $T^2$ value or the DModX value calculated for the real-time data exceeds the corresponding values calculated for the surrogate variables, prediction module 20 determines that the real-time injection molding process data does not fit within the injection molding process model. This indicates that the injection molding production process is out of control. The quality of any product produced when the process is out of control is deemed suspect and potentially defective and therefore not suitable for use.

In an embodiment, prediction module 20 includes classification libraries that provide information regarding the specific process parameters monitored during production. The classification libraries may be used to precisely identify which process parameter or parameters caused the real-time process data to exceed the control limit. The information from the classification libraries may be used to adjust the process to bring the real-time production process data back into control.

In a further embodiment, system 10 may include a visualization module 34 which includes an interface between data analysis module 16 and prediction module 20 and logic to visually represent to a user on a display device 36 any data stored in data storage device 14, or any data present in data analysis model 16, data collector model 18 and prediction model 20. In addition, visualization model 34 may display data stored in the classification libraries, the process model, and the collected real-time data. Visualization module 34 further includes a keyboard 38 whereby the user may select different views of the data or input data into system 10. The results of the analyses performed by data analysis module 16 or prediction module 20 as well as the raw process parameter data may be output to a file which may then be used by visualization module 34 permitting visualization of the overall injection molding process. This allows the user to visualize the individual process parameters, make statistical inferences about them such as Cp and Cpk, generate control charts, and determine the specific cause of an out of control situation. In an embodiment, data analysis module 16, prediction 20 module and visualization module 34 may be components of an integrated processing device, such as a computer, for example.

In another embodiment, the real-time data collected by data collection device 18 may be simultaneously delivered to data analysis module 16 as well as to prediction module 20. In this embodiment, data analysis module 16 combines the data collected real-time with the previous process data and performs multivariate statistical analysis on the combined data to update the injection molding process model. This adaptive modeling also adjusts the control limit in real-time. Adaptive modeling is advantageous as it provides a mechanism to account for or otherwise compensate for slight long-term shifts in the process. Such shifts may be the result of seasonal influences (e.g., humidity, temperature) or raw material characteristics.

Controller 22, which is in operative communication with prediction module 20, monitors and analyzes the results of the multivariate analysis performed by prediction module 20. Controller 22 subsequently performs an accept/reject decision based the information from prediction module 20 as well as past historical data and information acquired from the initial process validations that occurred prior to implementing the parametric injection molding process. When controller 22 validates the determination of an out of control situation by prediction module 20, controller 22 generates a signal and transmits this signal to diversion device 24. Diversion device 24 then moves a gate 40 into the path of product 28 moving along transporter 30. Gate 40 diverts or otherwise removes suspect product 42 that was produced during the out of control situation (i.e., when either the Hotelling $T^2$ value or the DModX value for the real-time data exceeds the corresponding value for the surrogate variables) off of transporter 30 and onto a reject transporter 44. The skilled artisan will appreciate that the diversion device may be any suitable device or mechanism capable of removing product off of the transporter. Nonlimiting examples of suitable alternate mechanism for the gate include a diverter gate, a reversing conveyor belt, and a drop-out mechanism.

Acceptable product 46 moves along transporter 30 for further processing. Responsive to the signal generated by controller 22, diversion device 24 thereby segregates any suspect product from acceptable product in real-time. The injection molding process 12 advantageously does not cease as suspect product is segregated from acceptable product. Product continues to be produced as diversion device 34 segregates or removes unacceptable product from acceptable product.

When prediction module 20 indicates to controller 22 that the real-time process data is within the control limit, controller 22 terminates generation of the signal to diversion device 24 and gate 34 moves (as indicated by arrow A) to a retracted position 48 (shown in phantom) away from and clear of transporter 30. When gate 34 is in retracted position 48, none of product 28 is diverted and product 28 moves along conveyor 30 as acceptable product 46 for further processing. In an embodiment, visualization module 34 may be operatively connected to controller 22 permitting the user to manually control the operation of diversion device 24. It is further understood that the production process may be halted when an out of control condition is identified by prediction model 20.

System 10 is particularly suitable for identifying a particular injection molding defect that is often undetected with conventional SPC methodologies. A double-shot is a defect whereby a molded part is not ejected from the mold and the mold closes on the part and repeats the molding process. A double-shot produces suspect product that prevents further assembly and sterility barrier breaches. It has been shown that system 10 has the ability to identify the double-shot defect and remove this unacceptable product from the injection molding process.

An advantage of the present invention is that the determination of an out of control situation and the removal of suspect product occurs substantially simultaneously and in real-time. System 10 allows for evaluations of variation in the production process to contribute to the determination of product quality in real-time. The real-time and coordinated operation of prediction module 20, controller 22 and diversion device 24 allows system 10 to selectively divert and remove suspect product from the injection molding process without having to halt the entire production process during on out of control situation. The out of control situation may self-correct or be corrected by a user monitoring the process with visualization module 34 thereby permitting acceptable product to continue for further processing. This significantly reduces production downtimes and improves production economies.

Moreover, the parametric release and real-time quality control provided by the present invention allows product intermediates to be sent down-line immediately and enabling product to be shipped earlier. The system and method of the present invention further enable process problems to be identified earlier yielding decreased process variability and more consistent product quality. This results in a better understanding of the process and improved preparedness and decision-making ability.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

What is claimed is:

1. A method of controlling the quality of a product produced by an injection molding process comprising:
   generating an injection molding process model from injection molding process data, the injection molding process model having a control limit, wherein the generating of the injection molding process model comprises performing a multivariate analysis on the injection molding process data using a multivariable analysis selected from the group consisting of performing a principal component analysis, calculating a Hotelling $T^2$ value, calculating a DModX value, performing a projection to latent structures analysis, and combinations thereof;
   collecting real-time injection molding process data;
   determining whether the real-time injection molding process data is within the control limit; and
   removing the product from the injection molding process when the real-time data process data exceeds the control limit.

2. The method of claim 1 wherein the determining and the removing occur substantially simultaneously.

3. The method of claim 1 wherein the injection molding process data and the real-time injection molding process data are selected from the group consisting of cycle time, melt temperature, fill time, melt pressure, cool time, pack time, mold temperature stationary, mold temperature moveable, injection time, hold time, shot velocity, shot cushion, fill pressure, pack pressure, hold pressure, back pressure, machine decomposition, hydraulic transfer pressure, position transfer, barrel temperatures, nozzle temperature and combinations thereof.

4. The method of claim 1 further comprising storing the injection molding process data in a database.

5. The method of claim 1 comprising the step of transforming the injection molding process data into at least one surrogate variable and calculating a Hotelling $T^2$ value and a DModX value for the at least one surrogate variable.

6. The method of claim 5 wherein the control limit is defined by the Hotelling $T^2$ value and the DModX value for the at least one surrogate variable.

7. The method of claim 6 comprising the step of calculating a Hotelling $T^2$ value and a DModX value for the real-time injection molding process data and comparing these values to the control limit.

8. The method of claim 7 wherein the control limit is exceeded if either the Hotelling $T^2$ value the DModX value for the real-time injection molding process data exceeds the Hotelling $T^2$ value or DModX value for the at least one surrogate variable.

9. The method of claim 1 further comprising the step of adjusting the control limit by combining the real-time injection molding process data to the stored injection molding process data and performing a multivariate analysis on the combined injection molding process data.

10. The method of claim 9 wherein the collecting the real-time injection molding process and adjusting the control limit occur substantially simultaneously.

11. A method for parametrically releasing a product produced by an injection molding production process comprising:
    collecting real-time production data from the injection molding production process;
    comparing the real-time production data to a predetermined production control limit generated by a multivariable analysis selected from the group consisting of performing a principal component analysis, calculating a Hotelling $T^2$ value, calculating a DModX value, performing a projection to latent structures analysis, and combinations thereof
    determining whether the real-time production data is within the predetermined production control limit; and
    removing from the injection molding production process any product produced when the real-time production data exceeds the control limit.

12. The method of claim 11 wherein the determining and removing occur substantially simultaneously.

13. The method of claim 11 wherein the injection molding production process proceeds during the removing.

14. An automated system for controlling the quality of a product produced by an injection molding production process comprising:
    a data analysis module for generating a predetermined injection molding production control limit by a multivariable analysis selected from the group consisting of performing a principal component analysis, calculating a Hotelling $T^2$ value, calculating a DModX value, performing a projection to latent structures analysis, and combinations thereof;
    a data collection device for collecting real-time injection molding production process data;

a prediction module for determining whether the real-time injection molding process data is within the control limit; and a diversion device in operative communication with the prediction module, the diversion device removing from the injection molding production process any product produced when the real-time injection molding production process data exceeds the control limit.

15. The system of claim 14 further comprising a controller in operative communication with the prediction module, the controller sending a signal to the diversion device when the real-time injection molding process data exceeds the control limit.

16. The system of claim 14 further comprising a transporter for removing the product from the injection molding machine.

17. The system of claim 16 wherein the diversion device further comprises a gate that removes product from the transporter.

* * * * *